Oct. 16, 1956 W. J. MARKS 2,766,644
SHARPENING TOOL
Filed Dec. 17, 1952
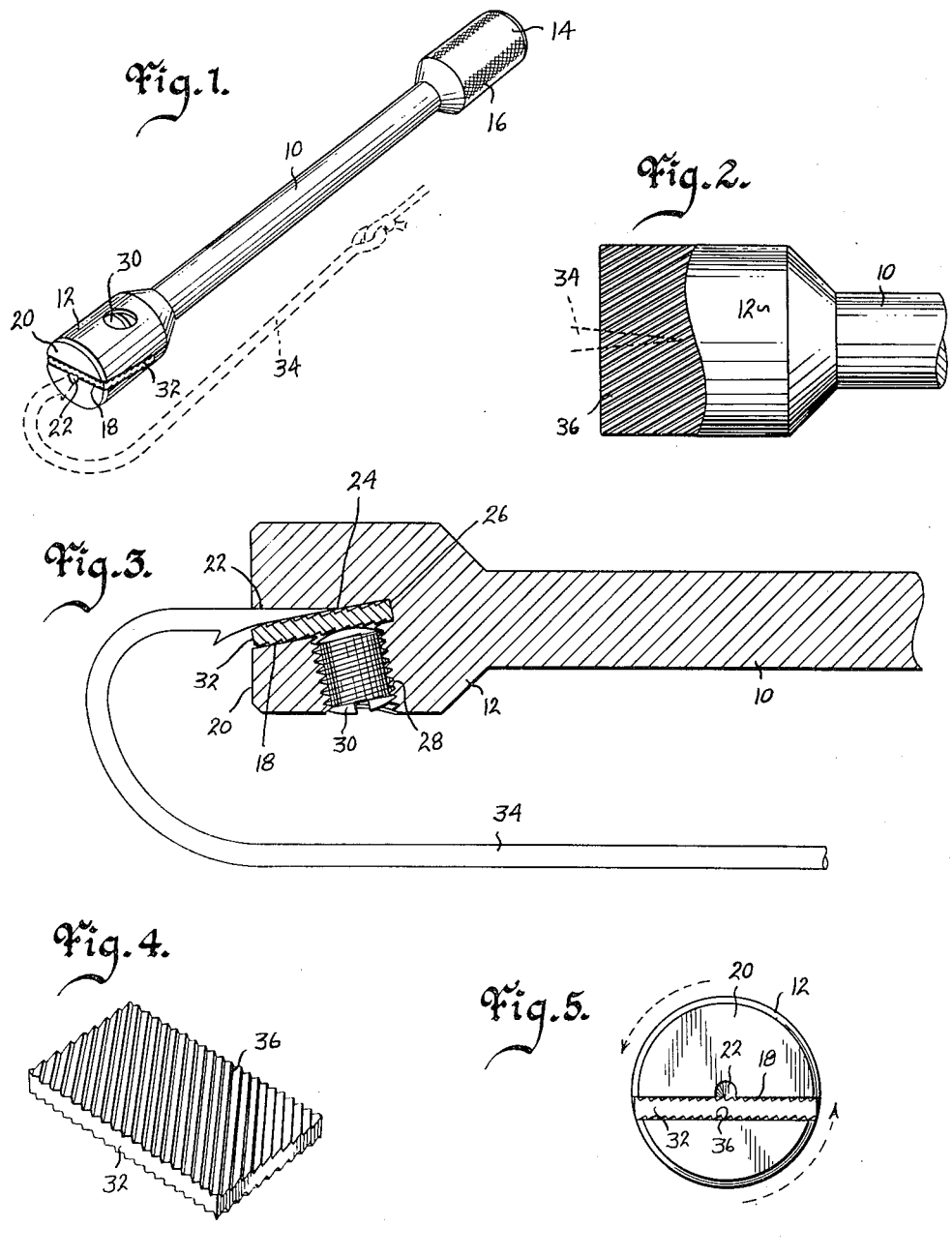
Inventor
William J. Marks
by Talbert Dick & Adler
Attorneys
Witness
Edward P. Seeley United States Patent Office 2,766,644
Patented Oct. 16, 1956

2,766,644

SHARPENING TOOL

William J. Marks, Des Moines, Iowa

Application December 17, 1952, Serial No. 326,386

2 Claims. (Cl. 76—88)

My invention relates to improvements in a sharpening tool of a type designed for maintaining a point on such items as fishing hooks, safety pins, needles and the like.

More particularly in this invention I provide a head portion in which is formed a perpendicular tapered opening. An elongated shank extends from the head portion and carries a knurled handle whereby the object to be sharpened can be inserted into the opening and the entire tool is twirled between the finger tips to provide a sharpening action on the inserted member.

Another object of this invention is to provide a tool of the above class that is relatively small in size so that it can be easily used in confined places, as for example, on the barbed points of fish hooks depending from a fishing lure.

A further object of this invention is to provide a sharpening tool as described in which the sharpening action is performed by an abrasive plate member that is removable from the opening in the head portion and which is also reversible so that both sides can be utilized in the event of excessive wear.

Still other objects of my invention are to provide a tool as characterized above that is refined in appearance, durable in construction, simple to use and convenient to carry and store.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of my invention illustrating its use on a fish hook shown in broken lines, Fig. 2 is an enlarged elevation view of the head portion of my invention with a section cut away to more fully illustrate its construction, Fig. 3 is a longitudinal section view of this tool shown with the barbed point of a fish hook arranged therein for sharpening, Fig. 4 is an enlarged perspective view of the abrasive plate used with this tool, and Fig. 5 is a bottom view of the head portion.

Referring to the drawings the numeral 10 designates an elongated rod-like shank member that has the enlarged head portion 12 integrally formed on one end and the enlarged handle or finger grip portion 14 integrally formed on the other end. Preferably the handle 14 is knurled as at 16 to facilitate the gripping thereof as will later appear. A slot 18 is formed in the head portion 12 so as to extend across the bottom and along the sides (Figs. 1 and 3) and is made at a slight angle to the bottom 20 of the head 12. A hole 22 extends perpendicularly from the bottom 20 and in communication with one side of slot 18 to a point 24 which is spaced from the inward end 26 of slot 18 as shown in Fig. 3. Thus at the bottom 20 of the head portion, the hole 22 and slot 18 combine to form a relatively wide opening compared with the width of the slot 18 between the points 24 and 26 and it will be observed that while the sides of slot 18 between points 24 and 26 are parallel, the sides of the slot and hole that form the opening below point 24 are not parallel. In this respect the side of the hole below point 24 is perpendicular to the bottom 20 and the side of the slot 18 between these points is at an angle to the bottom 20.

A threaded opening 28 is formed in the side of the head portion 12 so as to communicate with and be perpendicular to that side of slot 18 which is not intersected by the hole 22. This opening 28 is adapted to receive the set screw 30. A flat rectangular abrasive member 32 is inserted into slot 18 as shown in Figs. 1 and 3 and is preferably of such a size as to occupy all of the slot except the widened portion formed by the hole 18. In this position the set screw 30 will hold the member 32 immovable within the slot and because of the angle of the slot between points 24 and 26 relative to the bottom 20 of the head portion 12 it will be observed that member 32 is also disposed at an angle to bottom 20. Thus one side of member 32 becomes complementary with opening 22 in forming a tapered opening into the bottom of the head portion that is progressively narrower towards the interior which terminates at approximately point 24.

The abrasive 30 may be of any suitable type but preferably I make it of metal with a roughened surface 36 similar to a metal file. Both sides are roughened so that if any undue wear should develop, the member 30 can be reversed.

The use of this tool will be apparent from the illustration in Figs. 1 and 3 where it will be seen that the point of a member to be sharpened such as the fish hook 34 is merely inserted into opening 18, or the opening 18 can, of course, be placed over the point of the hook 34, and the entire tool is rotated by twirling the handle 14 between the finger tips. In this operation, the hook will be held stationary so that the abrasive member 30 will engage and rotate about the point. It will be understood that the rotation of this tool can be either clockwise or counterclockwise or both in alternate movements and it is particularly suited to sharpening the points on fish hooks, safety pins, phonograph needles and the like where a sharp point is essential to the efficient use of the particular article.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my sharpening tool without departing from the real spirit and purpose of my invention, and it is my intention to cover by my claims, any modified forms of structure or use of mechanical equivalents which may be reasonably included within their scope.

I claim:

1. A sharpening tool for pointed articles such as fish hooks, safety pins and the like, comprising, a head portion having a bottom end provided with a slot extending inwardly into said head portion at an angle to said bottom end, said head portion provided with a hole extending perpendicularly from said bottom end in communication with said slot to a point short of the inner end of said slot, a flat rectangular abrasive plate disposed within said slot so that one side of said plate and said hole are complementary in forming a tapered opening in said head portion progressively smaller in diameter from said bottom end to the inner end of said hole, said tapered opening adapted to receive the pointed end of an artcile to be sharpened and such article being sharpened upon rotation of the head portion.

2. A sharpening tool for pointed articles such as fish hooks, safety pins and the like, comprising, a head portion having a bottom end, said bottom end provided with a slot extending inwardly into said head portion at an angle to said bottom end, said head portion provided with a hole extending perpendicularly from said bottom end in communication with said slot to a point short of the inner end of said slot, a flat rectangular abrasive plate removably disposed within said slot so that one side of said plate and said hole are complementary in forming a tapered opening in said head portion progressively smaller in diameter from said bottom end to the inner end of said hole, said tapered opening adapted to receive the pointed end of an article to be sharpened, and manual grip means to facilitate the rotation of said head portion when the pointed end of an article is inserted as described so that said abrasive member will engage and rotate about said pointed end.

References Cited in the file of this patent

UNITED STATES PATENTS

| | | |
|---|---|---|
| 129,673 | Mason | July 23, 1872 |
| 136,590 | Crandal | Mar. 11, 1873 |
| 201,115 | Lombard | Mar. 12, 1878 |
| 217,446 | Clayton | July 15, 1879 |
| 237,763 | McDonald | Feb. 15, 1881 |
| 377,974 | Wheless | Feb. 14, 1888 |
| 1,021,128 | Brecker | Mar. 26, 1912 |
| 1,025,393 | Gillespie | May 7, 1912 |
| 2,309,194 | Hutchinson | Jan. 26, 1943 |
| 2,428,473 | Slocum | Oct. 7, 1947 |
| 2,465,442 | Gaylor | Mar. 29, 1949 |
| 2,542,281 | Lefteruk | Feb. 20, 1951 |

FOREIGN PATENTS

| | | |
|---|---|---|
| 136,914 | Great Britain | Dec. 31, 1919 |